United States Patent
Tabak

(10) Patent No.: US 12,159,466 B2
(45) Date of Patent: Dec. 3, 2024

(54) CONTEXT BASED LANE PREDICTION

(71) Applicant: AUTOBRAINS TECHNOLOGIES LTD, Tel Aviv (IL)

(72) Inventor: Tom Tabak, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 400 days.

(21) Appl. No.: 17/805,847

(22) Filed: Jun. 7, 2022

(65) Prior Publication Data

US 2023/0045885 A1 Feb. 16, 2023

Related U.S. Application Data

(60) Provisional application No. 63/202,348, filed on Jun. 7, 2021.

(51) Int. Cl.
*G06V 20/56* (2022.01)
*G06V 10/82* (2022.01)

(52) U.S. Cl.
CPC ............ *G06V 20/588* (2022.01); *G06V 10/82* (2022.01)

(58) Field of Classification Search
CPC .............................. G06V 20/588; G06V 10/82
USPC ......................................................... 382/159
See application file for complete search history.

(56) References Cited

U.S. PATENT DOCUMENTS

| | | | | |
|---|---|---|---|---|
| 11,557,051 B2* | 1/2023 | Guizilini | ................ | G06V 20/56 |
| 11,880,755 B2* | 1/2024 | Lustenberger | ........ | G06F 18/214 |
| 11,928,156 B2* | 3/2024 | Wang | .................. | G06F 16/9024 |
| 11,983,933 B1* | 5/2024 | Pronovost | ................ | G06N 5/04 |
| 2018/0174047 A1* | 6/2018 | Bourdev | .............. | G06V 10/82 |
| 2019/0311298 A1* | 10/2019 | Kopp | ..................... | G01C 25/00 |
| 2020/0380380 A1* | 12/2020 | Ramachandran | ...... | G06N 5/025 |
| 2020/0410288 A1* | 12/2020 | Capota | ................ | G06F 21/6245 |
| 2021/0142177 A1* | 5/2021 | Mallya | ................... | G06N 3/084 |
| 2021/0365344 A1* | 11/2021 | Bui | ......................... | G06F 17/18 |
| 2021/0374547 A1* | 12/2021 | Wang | ..................... | G06N 3/047 |
| 2022/0036246 A1* | 2/2022 | Chen | ...................... | G06N 5/022 |

(Continued)

FOREIGN PATENT DOCUMENTS

| | | | | | |
|---|---|---|---|---|---|
| CA | 3030453 A1 | * | 1/2018 | .......... | G06N 3/0445 |
| CA | 3035298 A1 | * | 3/2018 | ............. | G06F 17/16 |
| CA | 3066775 A1 | * | 4/2019 | ............. | G06F 18/00 |

(Continued)

*Primary Examiner* — Mahendra R Patel
(74) *Attorney, Agent, or Firm* — Reches Patents

(57) ABSTRACT

A method for context based lane prediction, the method may include obtaining sensed information regarding an environment of the vehicle; providing the sensed information to a second trained machine learning process; and locating one or more lane boundaries by the second trained machine learning process. The second trained machine learning process is generated by: performing a self-supervised training process, using a first dataset, of a first machine learning process to provide a first trained machine learning process; wherein the first trained machine learning process comprises a first encoder portion and a first decoder portion; replacing the first decoder portion by a second decoder portion to provide a second machine learning process; and performing an additional training process, using a second dataset that is associated with lane boundary metadata, of the second machine learning process to provide a second trained machine learning process.

12 Claims, 4 Drawing Sheets

(56) References Cited

U.S. PATENT DOCUMENTS

2022/0055689 A1* 2/2022 Mandlekar ........ B60W 60/0025
2022/0343218 A1* 10/2022 Yueksel ................ G06N 20/20

FOREIGN PATENT DOCUMENTS

| CA | 3065939 A1 * | 7/2019 | ......... G06F 18/2148 |
| CA | 3090759 A1 * | 8/2019 | ............. G06N 20/00 |
| CA | 3122686 A1 * | 6/2020 | ............... G01V 1/28 |
| CN | 110414387 A * | 11/2019 | ......... G06K 9/00798 |
| EP | 3591586 A1 * | 1/2020 | .......... G06F 11/3608 |
| WO | WO-2021091681 A1 * | 5/2021 | ........... G06N 3/0454 |
| WO | WO-2021231139 A1 * | 11/2021 | ......... G02B 27/4272 |

* cited by examiner

CONTEXT BASED LANE PREDICTION

BACKGROUND

The accuracy of a machine learning process depends, at least in part, on the dataset used for training the machine learning process. For example—the likelihood of learning generalizable information dramatically increases as the number of relevant dataset items increases.

Lane detection includes detecting lane boundaries. Lane boundary detection is complicated because there is a very broad range of lane boundaries that differ from each other by shape and appearance.

Tagging images to indicate the presence of lane boundaries is relatively costly.

This broad range of lane boundaries and the lack of a significant amount of reliably tagged images prevents an application of a reliable lane detection method.

There is a growing need to provide a method for lane detection.

Because route planning and actuation modules do not have access to raw sensor input, the role of perception in the architecture is to exhaustively label the raw inputs from the car's sensors, e.g. detect cars and pedestrians, segment free drivable space, recognize speed limit through road signs, and everything else in the scene that could possibly affect driving in this scene. Since so many objects/entities need to be identified and accurately localized within the scene for the AEB to properly work, the perception module tends to be a complicated computationally-intensive model.

SUMMARY

There is provided a method, a system and/or a non-transitory computer readable medium for context based lane prediction.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
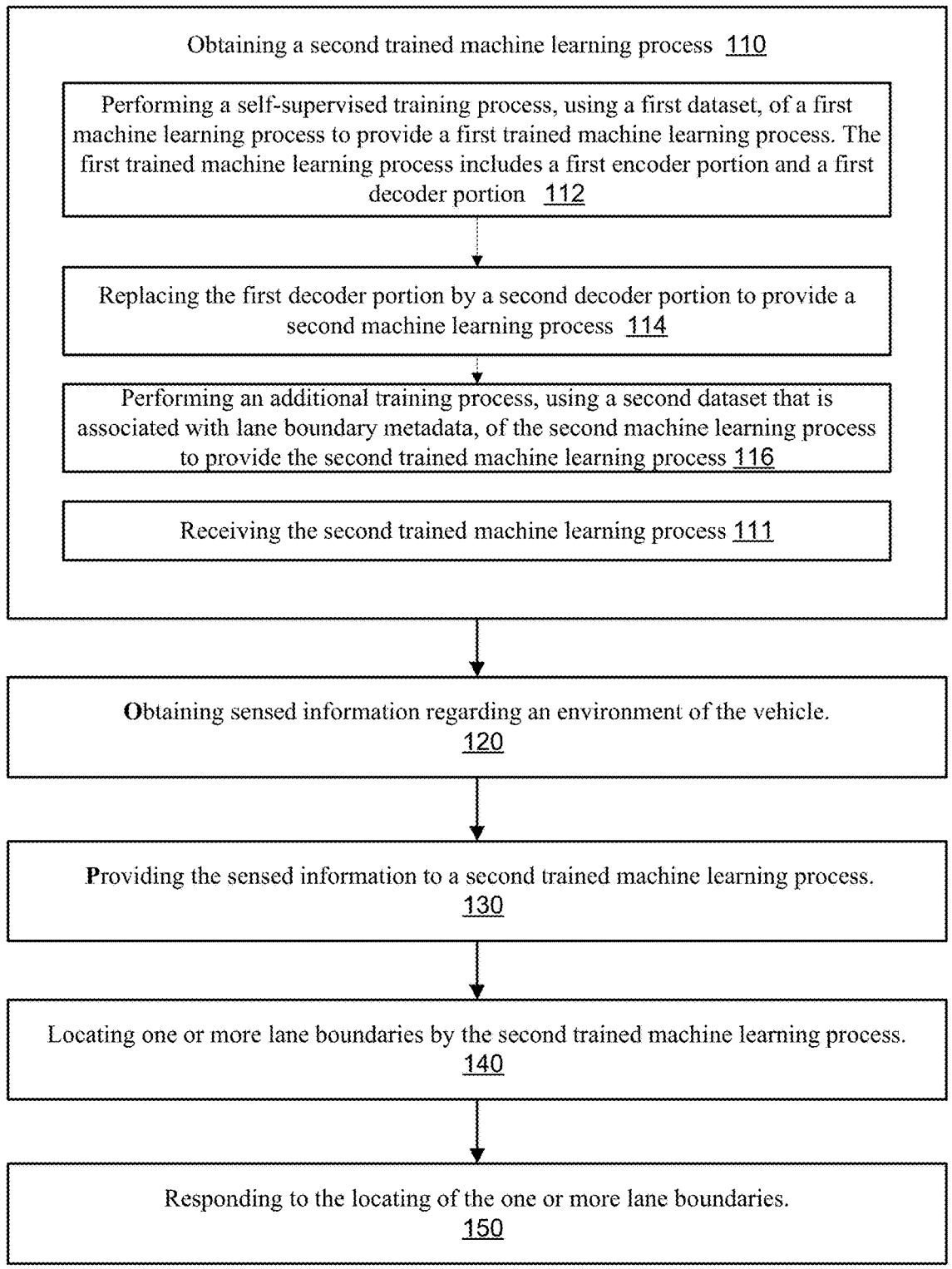
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided a method, a system and/or a non-transitory computer readable medium for context based lane prediction.

The method overcomes the mentioned above difficulties related to lane boundary detection (including the scarcity of supervised data and cost of its tagging) by using an unsupervised dataset, such as images acquired during driving sessions.

The method includes training processes—the first is applied on a first dataset of untagged images (referred to as first images) and the second is applied on a much smaller second dataset of tagged images (referred to as second images)—wherein the first images and the second images are of the same domain or a similar domain—for example both are images acquired by a vehicle image sensor—for example—the learning process of key-points of first images may assist to encode key-points of the second images.

A domain may refer to an underlying distribution of the data. As such two datasets can be said to be of the same domain if their underlying distribution is the same. A similar domain may be of the same type of information (for example images acquired by a vehicle) but the different datasets may differ in context (highway, urban, country road), location (city/country) and/or weather conditions (rainy, sunny, night etc.).

Alternatively—the first and second images may be of the same type—for example obtained by the same sensors (for example same vehicle sensors).

The unsupervised datasets may include a large number of first images (for example—more than one thousand, more than ten thousand, more than one hundred thousand, more than a million images, and the like).

These unsupervised datasets are used to train a first machine learning process to reconstruct sensed information by applying a first encoder and a first decoder.

During the training:
a. The first encoder receives first images and encodes the first images to provide encoded first images. The first images (or at least a vast majority of the first images) are not expected to include lane boundary tags—they are not lane boundary tagged images.
b. The first decoder receives the first encoded images and decodes them—in an attempt to reconstruct the first images.

This training is referred to as a self-supervised training process because the input (first images) to the first machine learning process include the required outcome of the first machine learning process—which is reconstructed first images that should be as similar as possible to the first images.

At the end of the self-supervised training process should be configured to reconstruct first images—although this capability is related to first images that are not lane-boundary specific (can be referred to as general images).

The self-supervised training process may cause the first machine learning process to efficiently encode key information (key features) of the first images and then decode this information in order to minimize a generalizable training loss.

More specifically—the self-supervised training process may cause the first decoder to be trained to decode a general image with the specific objective of reconstructing a general image—which may be of less significant when searching for specific images—that include lane boundaries.

In addition—the self-supervised training process may cause the first encoder to encode information of the first images while leveraging the large first dataset—while learning to encode key features in a generalizable manner—which is deemed to be desirable characteristic of an encoder in any given task. Because of the link (same domain) between the first images and the second images—it is beneficial to maintain the first encoder.

FIG. 1 illustrates an example of method 100.

Method 100 is for context based lane prediction.

Method 100 may start by step 110 of obtaining a second trained machine learning process.

Step 110 may include receiving the second trained machine learning process or participating in at least a part of the process that generated the second trained machine learning process.

Step 110 may be followed by step 120 of obtaining sensed information regarding an environment of the vehicle.

Step 120 may be followed by step 130 of providing the sensed information to a second trained machine learning process.

Step 130 may be followed by step 140 of locating one or more lane boundaries by the second trained machine learning process.

Step 140 may be followed by step 150 of responding to the locating of the one or more lane boundaries.

The responding may include determining the locations of the lanes that are bounded by the lane boundaries, generating an autonomous driving decision, generating an autonomous driving alert or indication, driving a vehicle in an autonomous manner based on the locations of the lane boundaries, generating an advanced driving assistance system (ADAS) driving decision, generating an ADAS driving alert or indication, generating a driver perceivable alert or indication, planning a progress of the vehicle, and the like.

Method 100—especially step 110 of receiving the second trained machine learning process, and steps 120, 130, 140 and 150—may be executed by a computerized system or a vehicle processor located in a vehicle.

A process for generating the second trained machine learning process may be executed by a vehicle computer, by a remote computerized system (for example a data center, a cloud computer and the like), may be executed by multiple vehicle computers located at multiple vehicles, and the like.

Assuming, for simplicity of explanation, that step 110 includes executing a process that generated the second trained machine learning process—then step 110 may include steps 112, 114 and 116. It should be noted that step 110 may include step 111 of receiving the second trained machine learning process, or executing only some of steps 112, 114 and 116.

Step 112 may include performing a self-supervised training process, using a first dataset, of a first machine learning process to provide a first trained machine learning process. The first trained machine learning process includes a first encoder portion and a first decoder portion.

The first images (or at least a vast majority of the first images) are not expected to include lane boundary tags—they are not lane boundary tagged images.

The self-supervised process may use any loss function and may be optimized in the sense that it may minimize or reduce an image reconstruction loss in any known manner. An example of the loss function is mean squared error of a pixel-wise reconstruction of the first image. This will allow the first encoder to efficiently encode key information and allow the first decoder to decode the encoded images in order to minimize the generalizable (due to the high volume of data) training loss.

Step 112 may be followed by step 114 of replacing the first decoder portion by a second decoder portion to provide a second machine learning process.

The second decoder may be randomly initialized.

Step 114 may be followed by step 116 of performing an additional training process, using a second dataset that is associated with lane boundary metadata, of the second machine learning process to provide the second trained machine learning process.

Step 116 may include maintaining the first encoder unchanged during the additional training process.

Step 116 may include modifying the first encoder during the additional training process.

The modification may start at any point of the additional training process—for example a start of a conversion of at least some layers of the second decoder.

The modifying of the first encoder may be executed in any manner—for example—it may start from deeper layers of the first encoder.

Referring to step 116—the lane detection task may be defined as segmentation or any other task definition may be applied mutatis mutandis. At the start of step 116 the first encoder weights can be frozen (maintain unchanged)—as this may, for example, retaining the information learned in the first machine learning process and train the second decoder upon this knowledge-base.

Once step 116 reaches a stage where gradients of one or more layers (for example latent layers) of the second decoder start converging—then step 116 may unfreeze (gradually or not) the weights of one or more layers of the second encoder—in any manner—for example starting from the deepest encoder layers, upon each layers' convergence. This 'fine-tuning', may contribute to the provision of weights of both the first encoder and the second decoder that are adjusted towards lane boundary detection and may form a single pipeline adapted to find lane boundaries.

The first machine learning process and the second machine learning process may be implemented by one or more neural networks, by a neural network processor, by instructions executed by a processor, and the like.

Figure 2:
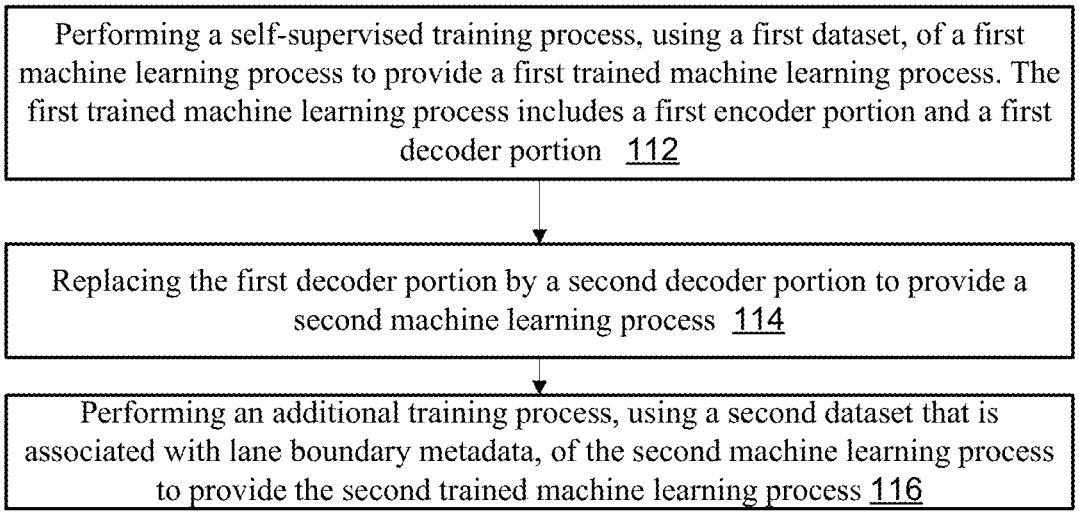
FIG. 2 illustrates an example of a method.

FIG. 2 illustrates an example of method 200 for generating a second trained machine learning process.

Method 200 may include steps 112, 114 and 116.

Step 112 may include performing a self-supervised training process, using a first dataset, of a first machine learning process to provide a first trained machine learning process. The first trained machine learning process includes a first encoder portion and a first decoder portion.

The first images (or at least a vast majority of the first images) are not expected to include lane boundary tags—they are not lane boundary tagged images.

The self-supervised process may use any loss function and may be and optimized in the sense that it may minimize or reduce an image reconstruction loss in any known manner. An example of the loss function is mean squared error of a pixel-wise reconstruction of the first image. This will allow the first encoder to efficiently encode key information and allow the first decoder to decode the encoded images in order to minimize the generalizable (due to the high volume of data) training loss.

Step 112 may be followed by step 114 of replacing the first decoder portion by a second decoder portion to provide a second machine learning process.

The second decoder may be randomly initialized.

Step 114 may be followed by step 116 of performing an additional training process, using a second dataset that is associated with lane boundary metadata, of the second machine learning process to provide the second trained machine learning process.

Step 116 may include maintaining the first encoder unchanged during the additional training process.

Step 116 may include modifying the first encoder during the additional training process.

The modification may start at any point of the additional training process—for example, a start of a conversion of at least some layers of the second decoder.

The modifying of the first encoder may be executed in any manner—for example—it may start from deeper layers of the first encoder.

Referring to step 116—the lane detection task may be defined as segmentation or any other task definition may be applied mutatis mutandis. At the start of step 116 the first encoder weights can be frozen (maintain unchanged)—as this may, for example, assist in better training the second decoder.

Once step 116 reaches a stage where gradients of one or more layers (for example latent layers) of the second decoder start converging—then step 116 may unfreeze (gradually or not) the weights of one or more layers of the second encoder—in any manner—for example starting from the deepest encoder layers, upon each layers' convergence. This 'fine-tuning', may contribute to the provision of weights of both the first encoder and the second decoder that are adjusted towards lane boundary detection and may form a single pipeline adapted to find lane boundaries.

The first machine learning process and the second machine learning process may be implemented by one or more neural networks, by a neural network processor, by instructions executed by a processor, and the like.

Figure 3:
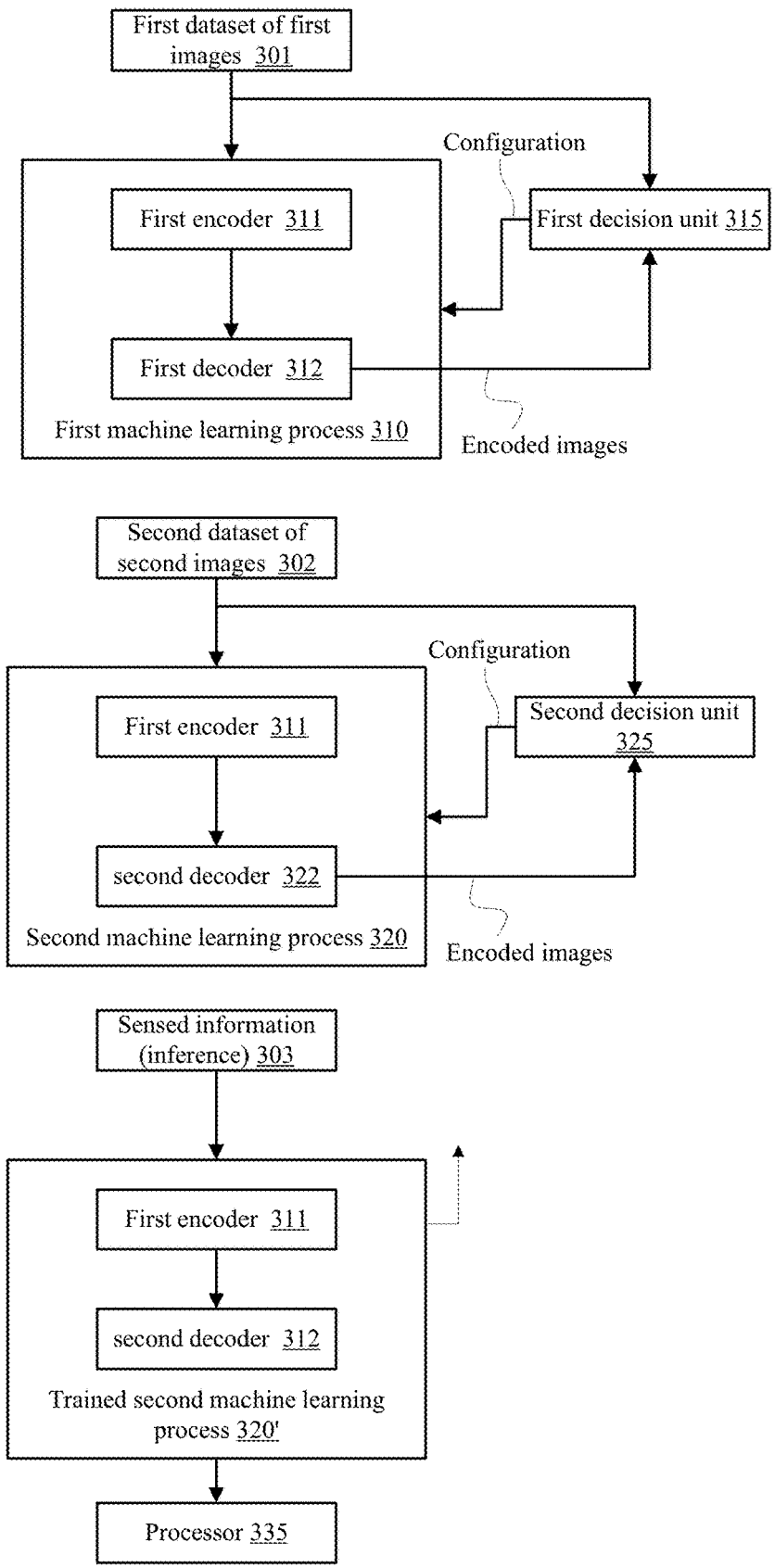
FIG. 3 illustrates an example of machine learning processes.

FIG. 3 illustrates an example of various machine learning processes, data elements.

FIG. 3 illustrates a first dataset of first images 301 fed to a first machine learning process 310 that include first encoder 311 and first decoder 312. The self-supervised training process is controlled by a first decision unit 315 that may apply a first loss function and configure the weights of the first machine learning process 310 based on the first dataset of first images 301 and encoded images from the first decoder 312. The decision unit may be or may include an optimizer.

FIG. 3 also illustrates a second dataset of second images 301 fed to a second machine learning process 320 that includes first encoder 311 (now trained) and second decoder 322. The tagged based training process is controlled by a second decision unit 325 that may apply a second loss function and configure the weights of the second machine learning process 320 based on lane boundary detection metadata and second images of the second dataset 302 and encoded images from the second decoder 322.

FIG. 3 also illustrates an inference stage that is executed by the now second trained machine learning process 320'. Sensed information (such as images acquired by a vehicle sensor) may be fed to the second machine learning process 320 that may output information regarding the presence and/or location of lane boundaries.

This information may be fed to a processor 335 that may respond to the detection of any lane boundaries.

Figure 4:
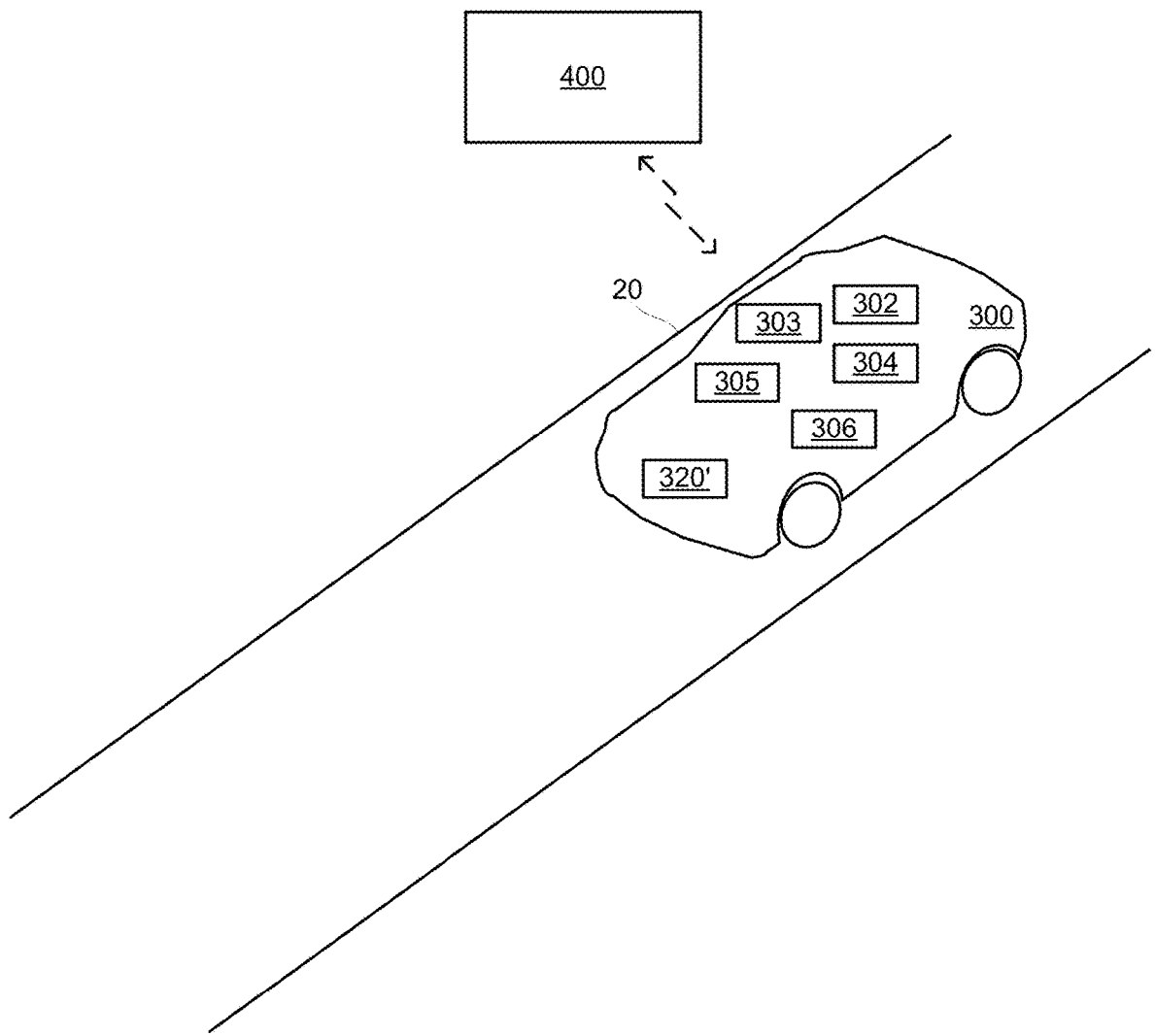
FIG. 4 illustrates an example of a vehicle and its environment.

FIG. 4 illustrates a road 20, and vehicle 300 that includes the second trained machine learning process 320', one or more vehicle sensors 302, communication unit 303 for inter-vehicle and/or intra vehicle communication, a man machine interface 304 for communicating with a driver, and one or more vehicle systems such as an autonomous driving system 305 and/or an ADAS system 306.

FIG. 4 illustrates also illustrates a computerized system 400 that may communicate with the vehicle and executed various steps of method 200. It may also execute at least one step of method 100.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for context based lane prediction, the method comprises: obtaining sensed information regarding an environment of a vehicle;
providing the sensed information to a second trained machine learning process;
and locating one or more lane boundaries by the second trained machine learning process;
wherein the second trained machine learning process is generated by:
performing a self-supervised training process, using a first dataset, of a first machine learning process to provide a first trained machine learning process;
wherein the first trained machine learning process comprises a first encoder and a first decoder; wherein the first dataset lacks lane boundary metadata;
replacing the first decoder portion by a second decoder portion to provide a second machine learning process;

performing an additional training process, using a second dataset that is associated with lane boundary metadata, of the second machine learning process to provide the second trained machine learning process; and modifying, during the additional training process of the second machine learning process, the first encoder starting from deeper layers of the first encoder.

2. The method according to claim 1, wherein the first dataset and the second dataset are from a same domain or of a similar domain.

3. The method according to claim 1 wherein the second decoder is randomly initialized.

4. The method according to claim 1, wherein the modifying the first encoder occurs during the additional training process.

5. The method according to claim 1, wherein the modifying the first encoder occurs following a start of a conversion of at least some layers of the second decoder.

6. The method according to claim 1 comprising receiving the second machine learning process and training the second machine learning process.

7. A non-transitory computer readable medium for context based lane prediction, the non-transitory computer readable medium stores instructions for:

obtaining sensed information regarding an environment of a vehicle;

providing the sensed information to a second trained machine learning process; and locating one or more lane boundaries by the second trained machine learning process;

wherein the second trained machine learning process is generated by:

performing a self-supervised training process, using a first dataset, of a first machine learning process to provide a first trained machine learning process; wherein the first trained machine learning process comprises a first encoder and a first decoder;

wherein the first dataset lacks lane boundary metadata;

replacing the first decoder by a second decoder to provide a second machine learning process;

performing an additional training process, using a second dataset that is associated with lane boundary metadata, of the second machine learning process to provide a second trained machine learning process; and modifying the first encoder starting from deeper layers of the first encoder.

8. The non-transitory computer readable medium according to claim 7, wherein the first dataset and the second dataset are from a same domain of a similar domain.

9. The non-transitory computer readable medium according to claim 7 wherein the second decoder is randomly initialized.

10. The non-transitory computer readable medium according to claim 7, wherein the modifying the first encoder occurs during the additional training process.

11. The non-transitory computer readable medium according to claim 7, wherein the modifying the first encoder occurs following a start of a conversion of at least some layers of the second decoder.

12. The non-transitory computer readable medium according to claim 7 that stores instructions for receiving the second machine learning process and training the second machine learning process.

* * * * *